United States Patent [19]

Hamisch, Jr.

[11] 4,116,747

[45] Sep. 26, 1978

[54] HAND-HELD LABELER

[75] Inventor: Paul H. Hamisch, Jr., Franklin, Ohio

[73] Assignee: Monarch Marking Systems, Inc., Dayton, Ohio

[21] Appl. No.: 790,519

[22] Filed: Apr. 25, 1977

[51] Int. Cl.[2] .................... B32B 31/00

[52] U.S. Cl. .................... 156/384; 101/287; 101/288; 101/293; 101/348; 156/541; 156/577; 156/579; 156/584

[58] Field of Search .................... 156/384, 541, 542, 584, 156/577, 579; 101/287, 288, 291, 292, 293, 294, 295, 348

[56] References Cited

U.S. PATENT DOCUMENTS

| | | | |
|---|---|---|---|
| 3,960,642 | 6/1976 | Hamisch et al. | 156/384 |
| 4,035,225 | 7/1977 | Hamisch et al. | 156/584 |
| 4,044,677 | 8/1977 | Hamisch | 101/348 |

*Primary Examiner*—Caleb Weston
*Attorney, Agent, or Firm*—Joseph J. Grass

[57] ABSTRACT

There is disclosed a labeler having a frame and a subframe, with a print head movably mounted on the subframe for cooperation with a platen. A label hold-down member is disposed in overlying relation to the platen. The subframe carries a label roll composed of labels releasably secured by pressure sensitive adhesive to a web of supporting material, and the subframe defines a path for the web. The label roll is mounted on improved mounting structure. A manually operable actuator drives a gear which in turn effects movement of the print head. The gear carries a pivotal pawl which drives a ratchet wheel. The ratchet wheel and a toothed feed wheel mounted in the subframe are adjustable with respect to each other. A die roller cooperable with the toothed wheel is spring-urged against the toothed wheel. The frame includes a movable frame section mounted on a pivot to facilitate easy replacement of an ink roller. The pivot also mounts an applicator roll and a leaf spring of the inking mechanism. The frame section is releasably latched in place.

37 Claims, 23 Drawing Figures

HAND-HELD LABELER

BACKGROUND OF THE INVENTION

1. Field of the Invention

This invention relates to the art of labelers.

2. Brief Description of the Prior Art

U.S. Pat. No. 3,968,745 to William A. Jenkins granted July 13, 1976 discloses a labeler with a frame and a subframe, a platen and a print head mounted on the subframe, an actuator having a pair of gear sections, gears driven by the gear sections, and a pair of gear sections or racks on the print head cooperable with the gears. A toothed feed wheel and a ratchet wheel are disposed between the gears. The ratchet wheel is adjustable relative to the feed wheel. A removable section is pivotally mounted on the frame. The removable section carries an inking mechanism. The subframe mounts a die roll in mating cooperation with the feed wheel. The frame mounts an applicator in the form of a roll. In one embodiment, the front end of the labeler has a pivotal frame section to enable replacement of the ink roller.

U.S. patent application Ser. No. 649,945, filed Jan. 19, 1976 of Paul H. Hamisch, Jr., and Donald L. Karn, now U.S. Pat. No. 4,035,225 granted July 12, 1977, discloses a curved leaf spring which assists in the gradual paying out of the composite label web from the label roll, and further discloses in two different embodiments structure for adjusting a feed wheel and a ratchet wheel relative to each other.

U.S. patent application Ser. No. 604,389, filed Aug. 13, 1975 of Paul H. Hamisch, Jr., now U.S. Pat. No. 4,044,677 granted Aug. 30, 1977, discloses interference members for enabling an inker body or carrier to be assembled onto a removable member but prevents the carrier from becoming disassembled when the ink roller on the carrier is in its operative position with respect to the print head. U.S. Pat. No. 3,440,123, to Paul H. Hamisch, Sr., granted Apr. 22, 1969 discloses a cam-controlled inker.

SUMMARY OF THE INVENTION

The invention provides an improved mechanism for adjusting the relative positions of the ratchet wheel and the feed wheel to vary the registration of the labels with respect to the delaminating means and to the printing means. This mechanism includes a pair of clutch members which can be shifted apart and rotated relative to each other to change the adjustment between the feed and ratchet wheels. The user can make the adjustment by manually driving the feed wheel when the clutch members have been shifted axially out of clutching engagement with respect to each other. More specifically, there is a drive connection between one clutch member and the feed wheel which prevents relative rotation between that one clutch member and the feed wheel but allows relative shifting movement between that clutch member and the feed wheel. A spring normally holds that clutch member and the other clutch member in clutching engagement with each other. The other clutch member is coupled to the ratchet wheel. The ratchet wheel is mounted by one side of the subframe and the feed wheel is mounted by the other side of the subframe. The subframe is disposed in the space within the frame. The frame mounts a shaft and the shaft mounts a movable section or cover which is movable between closed and open positions, an applicator roll, and a portion of an inking mechanism. The inking mechanism is simple in construction and easy to assemble, but the inking mechanism will stay in its assembled position even through the labeler is dropped on the floor. The inking mechanism includes a pivotally mounted carrier mounted on the cover and a leaf spring connected to the shaft and to the carrier. The carrier mounts a roller which is urged against a cam on the print head by the leaf spring. The print head preferably has two lines of printing members for printing two lines of data. A hold-down device is used to hold a label and the underlying supporting material web down so that there is no gap between the web and the platen. This feature is conducive to quality printing because the print need not move the label and the web toward the platen and because if it can be assured that the web lies against the platen, then the distance between the print head in the home or rest position and the platen can be kept to a minimum. It is preferred that a die roll be used to urge the supporting material web against the toothed feed wheel. In addition, the die roll is spring-urged against the web to accommodate for manufacturing variations in the labeler. The die roll is carried by a holder which is nested in the subframe and which includes a pair of leaf springs. Thus, adequate mating cooperation between the die and feed wheels is assured. A leaf spring is disposed in cooperation with the web where it is first paid out of the label roll. The leaf spring has a mounting portion keyed to the subframe. The leaf spring is conducive to the gradual paying out of the web from the label roll. The leaf spring and its mounting portion are comprised of one-piece molded plastics material. There is a brake which acts on the composite label web between the place where the composite web is paid out of the label roll and the platen. The brake includes a roll which is loosely mounted in the subframe and the print head carrier leaf springs which contact a brake roll at spaced-apart locations. The use of such separate leaf springs is conducive to effective braking action against the composite web in spite of manufacturing variations.

DESCRIPTION OF THE PREFERRED EMBODIMENT

Figures 1, 2:
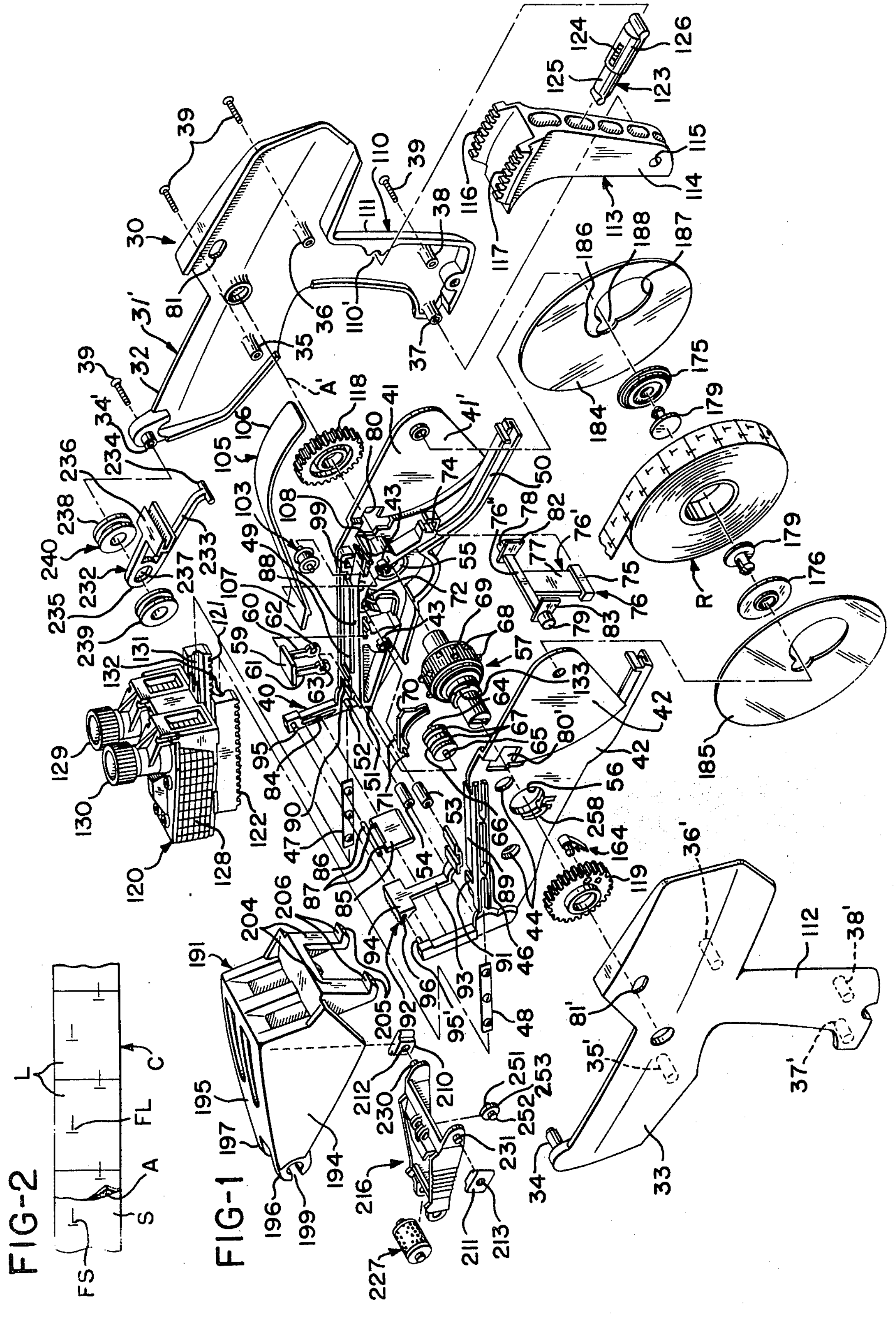
FIG. 1 is an exploded perspective view of a hand-held label printing and applying apparatus in accordance with the invention.
FIG. 2 is a top plan view of a composite web of labels capable of being used in the apparatus.

Referring initially to FIG. 1, there is shown a label printing and applying apparatus or labeler generally indicated at 30 having a frame or body generally indicated at 31 which includes a frame section or body section 32 and a frame section or body section 33. The frame section 32 is shown to have tubular posts or shafts 34′, 35, 36, 37 and 38 and the body section 33 is shown to have generally tubular aligned posts 34, 35′, 36′, 37′ and 38′. Screws 39 are received in the posts 34′, 35, 36 and 38 and are threadably received in respective posts 34, 35′, 36′ and 38′. The frame sections 32 and 33 are mates to each other and are substantially mirror-images of each other.

Figure 4:
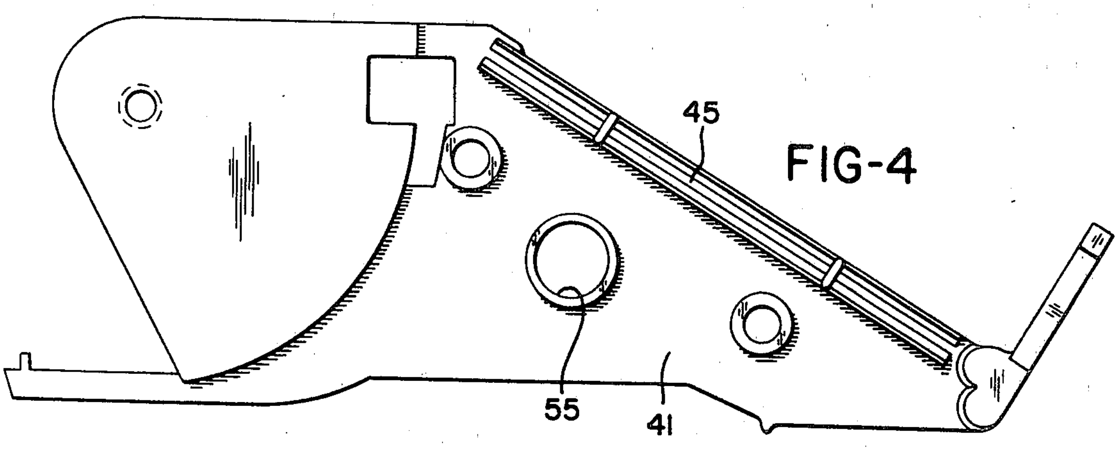
FIG. 4 is a side elevational view of one of the subframe sections of the subframe.
Figure 5:
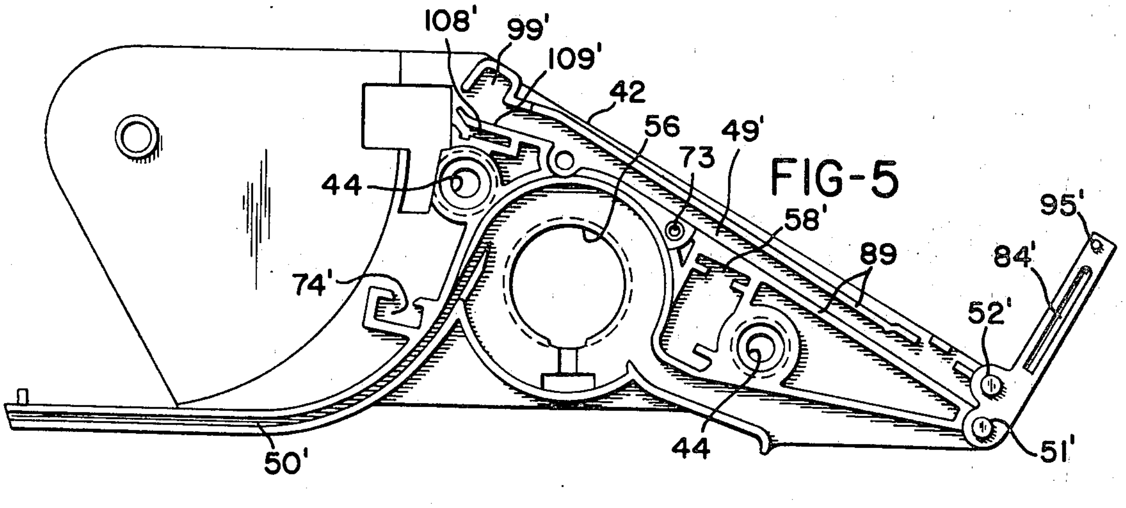
FIG. 5 is a side elevational view of the other subframe section.
Figure 20:
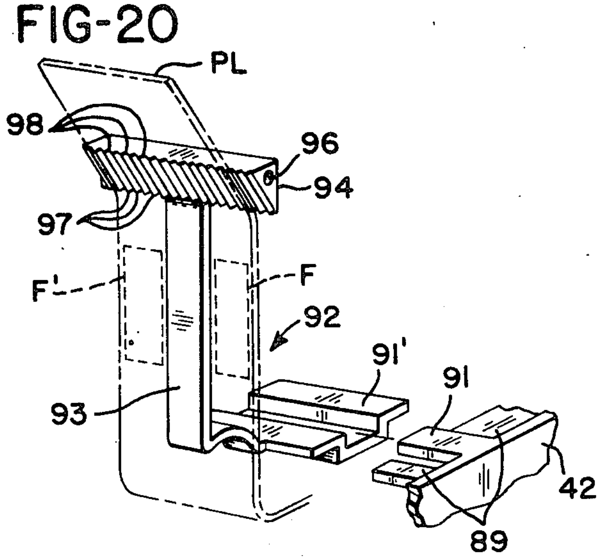
FIG. 20 is a perspective view of a label hold-down and guiding device and a portion of the subframe.

A subframe generally indicated at 40 is shown to include subframe sections 41 and 42. The subframe section 41 is shown to have male projections 43 received in and held in a snap-fit manner in apertures 44. With reference also to FIGS. 4 and 5, the subframe sections 41 and 42 have respective ball tracks 45 and 46 for receiving respective rollingcontact bearing members specifically ball-bearing strips 47 and 48. The subframe sections 41 and 42 have respective guideways 49 and 50 and 49′ and 50′. The subframe sections 41 and 42 have respective posts 51 and 52 and 51′ and 52′ for receiving respective tubular rollers 53 and 54. The posts 51 and 51′ rotatably mount the tubular roller 53 and the posts 52 and 52′ rotatably mount the tubular roller 54. The subframe sections 41 and 42 have respective round holes 55 and 56 for rotatably mounting a feed wheel assembly generally indicated at 57. The subframe sections 41 and 42 have respective non-circular, specifically dove-tail, recesses 58 and 58′ for receiving a holder 59. The holder 59 is of one-piece molded plastics construction and includes a pair of leaf springs or spring fingers 60 and 61 having a pair of respective sockets 62 and 63. The sockets are preferably open-sided and preferably extend for more than 180° but substantially less than 360° so as to receive respective stub ends 64 and 65 of a die roller 66. The die roller 66 has a pair of grooves 67 that correspond in contour and alignment to teeth 68 of toothed feed wheel 69 of the assembly 57. The teeth 68 are staggered and are disposed in two annular rows. A guide plate 70 which is disposed between the rows of teeth 68 has oppositely extending posts 71. The posts are received in holes 72 and 73 of the respective subframe sections 41 and 42 to confine the supporting material web S of the composite web C in proximity to the surface of the feed wheel 69. The subframe sections 41 and 42 have respective non-circular recesses 74 and 74′ for keying end portions of a non-circular post 75 of a latch 76. A bar 76″ is connected to the post 75 by a leaf spring 77. The bar 76″ has a pair of manually engageable projections 78 and 79 which extend through respective openings 80 and 80′ in subframe sections 41 and 42 and through respective openings 81 and 81′ in the frame sections 32 and 33. Shields 82 and 83 are disposed inbound of the projections 78 and 79. The shield 82 is disposed between the frame section 32 and the subframe section 41 and the shield 83 is disposed between the frame section 33 and the subframe section 42. The shields 82 and 83 serve to keep dust out of the inside of the labeler 30. The subframe sections 41 and 42 have elongated recesses 84 and 84′. Marginal side portions of a platen 85 are received in the respective recesses 84 and 84′ and marginal ends of a delaminator, specifically a peel roller 86, are received in the same elongated recesses 84 and 84′. The peel roller 86 is in direct contact with shoulders 87 at the ends of the marginal sides of the platen 85. The shoulders 87 define an end edge of the platen 85. There is a minimum of friction between the shoulders 87 and the peel roller 86 because of minimal contact. In addition, any non-linearity of the peel roller 86 will have little or no effect because only the end portions of the peel roller 86 are contacted by the shoulders 87. It is apparent that both the platen 85 and the peel roller 86 are captive in the same respective recesses 84 and 84′. The guideways 49 and 49′ are formed in part by guides 88 and 89. Spaced from the respective guides 88 and 89 are projections 90 and 91. A hold-down and guide member generally indicated at 92 is shown to have a hold-down or guide member 93 which is disposed in overlying relationship with respect to the platen 85 and a direction-changing guide member 94. A mounting member 91′ is interlocked between guide 88 and projection 90 and between the guide 89 and the projection 91 as shown in FIGS. 1 and 20. In addition, the subframe sections 41 and 42 have posts 95 and 95′ received in a hole 96 in the member 94. The member 94 has a plurality of ridges 97 and intervening grooves 98 which extend in the direction of label travel shown by phantom lines PL in FIG. 20.

The subframe sections 41 and 42 have respective retaining recesses 99 and 99′ for receiving stub ends 100 and 101 of a brake roller 102 of a brake 103. The roller 102 is shown to have annular grooves 104 for receiving spaced-apart O-rings 104′.

A one-piece resilient device generally indicated at 105 includes a leaf spring or spring finger 106 which is shown to be curved and which is integrally connected to a mounting portion 107. The subframe sections 41 and 42 have respective recesses 108 and 108′ into which marginal sides of the mounting portion 107 are received. The resilient device 105 is shown to be disposed in overlying relationship with respect to label roll R adjacent the place where the composite web C is paid-out. The composite web C passes over the resilient device 105 and from there between the roller 102 and brake surfaces 109 and 109′. The brake 103 also includes a plurality of separate spaced-apart leaf springs 103', specifically two, which are in contact with the O-rings 104' of the roller 102 at spaced apart locations. The use of at least two such springs 103' facilitates reliable braking in spite of manufacturing variations.

Figure 3:
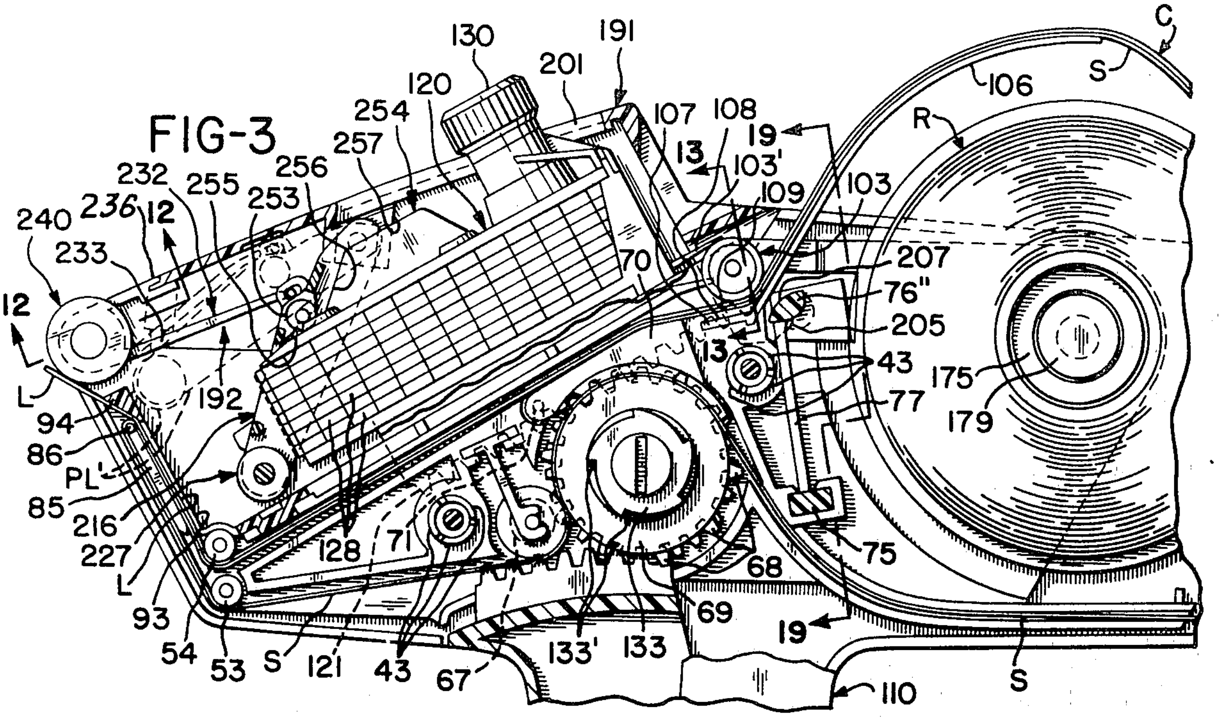
FIG. 3 is a fragmentary side elevational view partly in section.

The frame 31 has a handle generally indicated at 110 and includes handle portions 111 and 112. The posts 37 and 37' are disposed at the outer end portion of the handle 110. A manually operable actuator generally indicated at 113 is shown to include a lever 114 having a hole 115. The posts 37 and 37' are received in opposite ends of the hole 115 to pivotally mount the actuator 113. The actuator 113 is shown to include a pair of spaced-apart gear sections or segmental gears 116 and 117. The gear sections 116 and 117 mesh with respective gears 118 and 119 rotatably mounted on an axis A'. A print head generally indicated at 120 includes a pair of racks or gear sections 121 and 122 which mesh with respective gears 118 and 119. A resilient device generally indicated at 123 bears against the handle 110 and 110' and against the inside of the actuator 113 to urge the actuator 113', the feed assembly 57 and the print head 120 to their initial or rest positions as shown in FIG. 3. The resilient device 123 is shown to include a compression spring 124 which urges sections 125 and 126 to extend positions with respect to each other.

Figure 6:
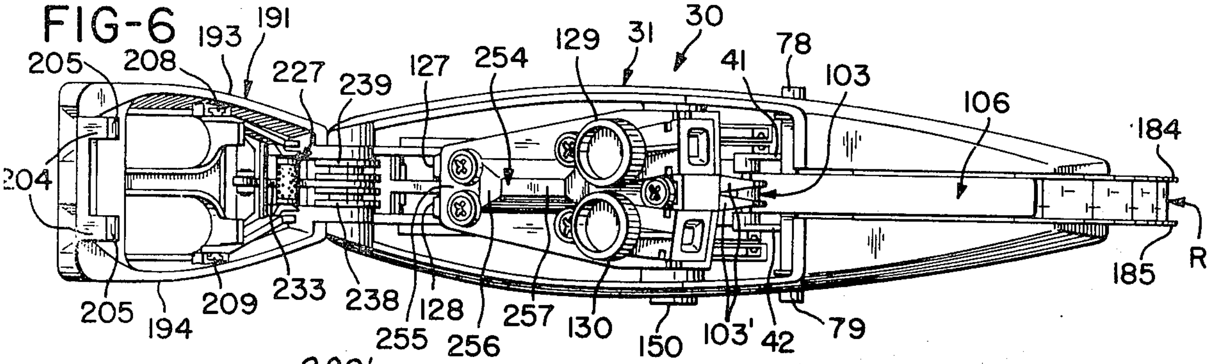
FIG. 6 is a top plan view of the apparatus with the cover in the open position.
Figure 7:
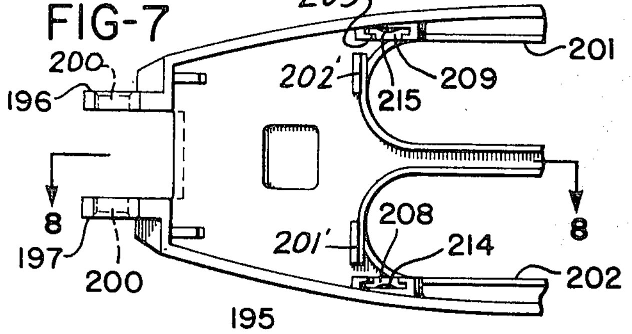
FIG. 7 is a fragmentary view of the cover.
Figure 9:
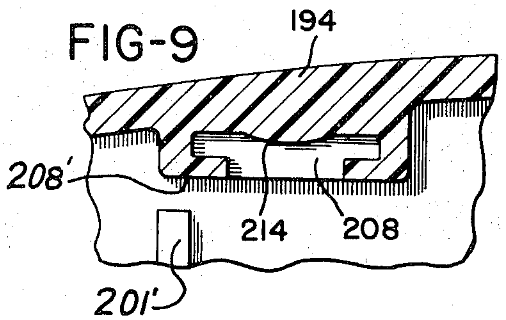
FIG. 9 is a sectional view taken along line 9—9 of FIG. 8.
Figure 8:
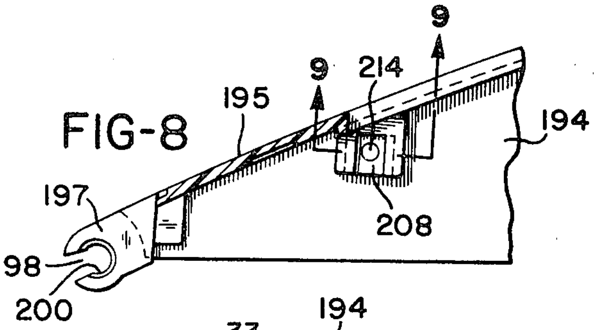
FIG. 8 is a sectional view taken along line 8—8 of FIG. 7.

The print head 120 is shown to have two sets of printing members 127 and 128 (FIGS. 1, 3 and 6) for printing two lines of data on a lebel L. The lines are printed in fields F and F' disposed on opposite sides of the hold-down membr 93. Each line of printing members 127 and 128 has selectively manually settable selectors 129 and 130 so that each line can print the selected data on the label L. The print head 120 also has a pair of tracks 131 and 132 cooperable with respective tracks 45 and 46 of respective subframe sections 41 and 42. The ball bearing strip 47 is in rolling contact with and between the tracks 131 and 45 and the bal bearing strip 48 is in rolling contact with and between the tracks 46 and 132. Accordingly, the print head 120 is mounted for movement into and out of cooperation with the platen 85. The racks or gear sections 121 and 122 are shown to be straight as are the tracks 45, 46, 131 and 132 so that the print head 120 moves in a straight line as is preferred.

Figure 14:
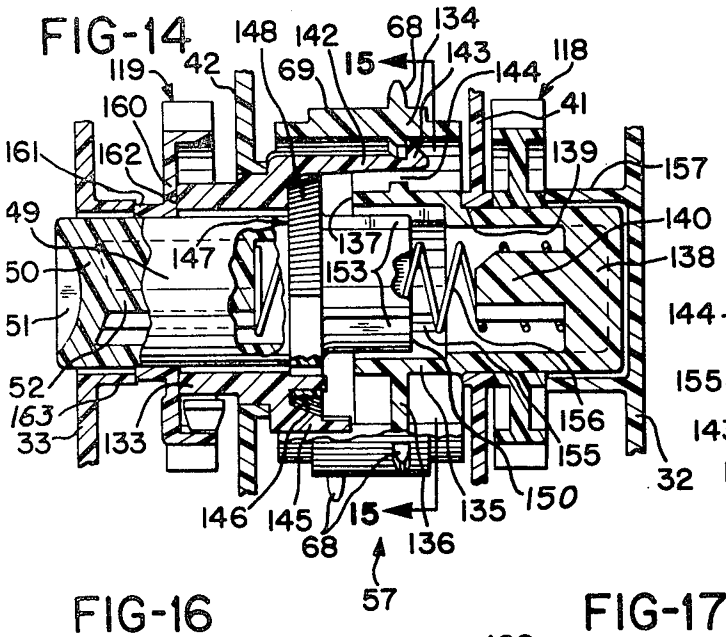
FIG. 14 is an enlarged sectional view showing fragmentary portions of the frame, the subframe, drive gears, the feed wheel, a ratchet and a mechanism for adjusting the position of the ratchet wheel relative to the feed wheel.
Figure 15:
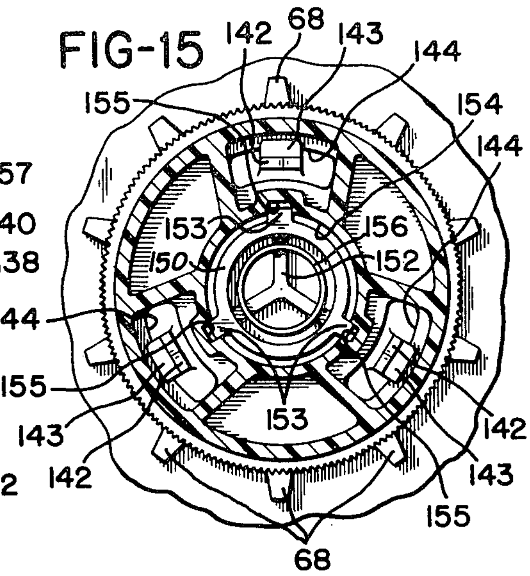
FIG. 15 is a sectional view taken along line 15—15 of FIG. 14.
Figure 16:
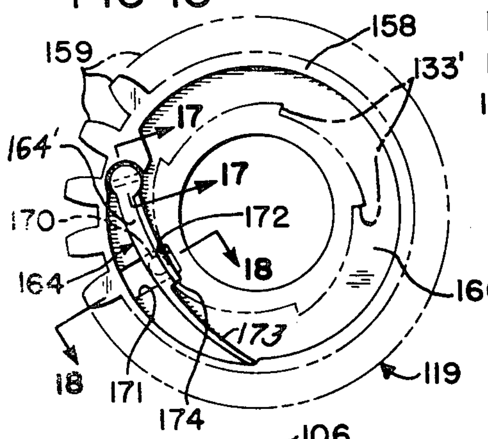
FIG. 16 is a view of one of the gears and a pawl which it carries, the ratchet teeth being shown in phantom lines.

With reference to FIGS. 14 and 15, the feed assembly 57 is shown to include the feed wheel 69 and a drive wheel, specifically ratchet wheel 133 having teeth 133' disposed in an annular arrangement. The feed wheel 69 and the ratchet wheel 133 are shown to be selectively movable with respect to each other. The feed wheel 69 is shown to have an annular rim 134 which is connected to a tubular hub portion or projection 135 by a web 136. The tubular portion 135 has an open end 137 and a closed end portion 138. The tubular portion 135 is shown to be rotatably mounted in an annular hole 139 in the subframe section 41. A projection or retainer 140 joined to the end portion 138 extends in the axial direction. The ratchet wheel 133 includes a plurality, specifically three, spring fingers 142 having respective projections or teeth 143. The spring fingers 142 extend through elongated slots or holes 144 in the web 136. When the ratchet wheel 133 is assembled onto the feed wheel 69, the projections initially cam the spring fingers 142 inwardly and as the projections 143 pass through the holes 144, they snap radially outwardly so that the ratchet wheel 133 is coupled in assembled relationship to the feed wheel 69 for limited rotational movement. The ratchet wheel 133 is therefore adjustable to a limited extent as limited by the length of the holes 144. The ratchet wheel 133 has a clutch member 145 with an inner surface beveled with respect to axis A' which is provided with a plurality of small closely spaced teeth 146. A clutch member generally indicated at 147 is shown to have a plurality of mating teeth 148 disposed on a bevel for cooperation with the teeth 146 of the clutch member 145. The clutch member 147 has tubular portions 149 and 150 which extend in opposite directions. The tubular portion 149 has a closed end portion 150' with a coin slot 151. A three-lobed seat 152 is joined to the end portion 150'. The outer surface of the tubular portion 150 is splined, having what is illustrated as being three splines 153 which are received in a splined hole 154 in the tubular portion 135. The splined hole has spline grooves 155. Accordingly, the clutch member 147 is keyed against rotation with respect to the feed wheel 69 but is slidable axially with respect to the feed wheel 69. The connection between the clutch member 147 and the feed wheel 69 is considered to be a splined connection. A compression spring 156, received within the tubular portions 135, 149 and 150, bears at its opposite ends against the end portion 138 and the seat 152. The projection 140 serves to locate and retain the spring 156 approximately axially disposed within the feed wheel 69. The position of the clutch members 145 and 147 relative to each other can be varied by the user by simply inserting a coin into the slot 151 and exerting an inward force to compress the spring 156, and as soon as the teeth 146 and 148 of the respective clutch members 145 and 147 are out of clutching engagement, the user can rotate the tubular portion 149 and hence the clutch member 147 and move it to a different selected position with respect to the clutch member 145. Rotation of the clutch member 147 causes simultaneous rotation of the feed wheel 69 because of the splined connection. As soon as the user releases the force on the end portion 150', the spring 156 returns the clutch member 147 into clutching engagement with the clutch member 145.

Figure 17:
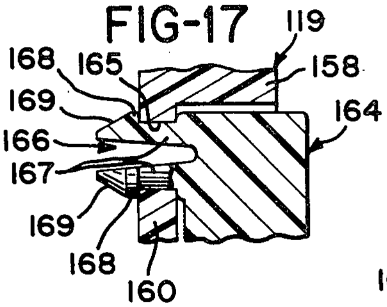
FIG. 17 is a sectional view taken along lines 17—17 of FIG. 16.
Figure 18:
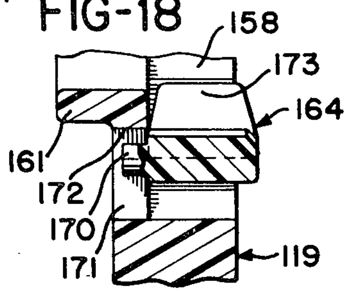
FIG. 18 is a sectional view taken along lines 18—18 of FIG. 16.
Figure 19:
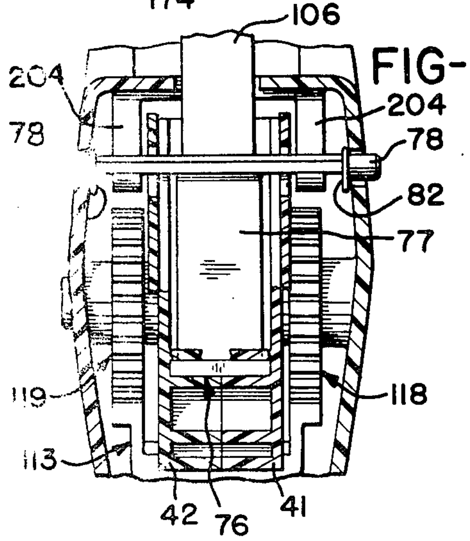
FIG. 19 is a sectional view taken along line 19—19 of FIG. 3.

The gear 118 is shown to be rotatably mounted on the projection 135 between the frame section 32 and the subframe section 41. The frame section 32 has an annular boss 157 which is shown to be out of contact with the tubular portion 135 but in contact with the gear 118. Accordingly, the gear 118 is captive between the subframe section 41 and the boss 157. The gear 119 includes an annular rim 158 with teeth 159 at its periphery. A web 160 is joined to one side of the rim 158 and to a tubular hub portion 161. The hub portion 161 is rotatably mounted on the tubular portion 149. The web 160 abuts the terminal end 162 of the ratchet wheel 133 and the tubular portion 161 abuts the end of an annular flange 163 of the frame section 33. Neither the frame section 33 nor its flange 163 contacts the tubular portion 149. Accordingly, the gear 119 is held captive between the ratchet wheel 133 and the flange 163. It is apparent that the feed assembly 57 is mounted to the subframe 40 which in turn is mounted by the frame 31. The adjustment is made from only one side of the frame 31 without the need to shift the feed or drive wheels relative to each other. The gear 119 carries a pawl unit generally indicated at 164. The web 160 has a hole or aperture 165. The pawl unit 164 has an integrally formed snap projection generally indicated at 166 which includes a split pivot or post 167 and projections 168 with beveled cam faces 169. In the position shown in FIG. 17, the pivot 167 rotatably mounts the pawl unit 164 to the gear 119 and the projections 168 prevent the pawl unit from being separated from the gear 119. The cam faces 169 facilitate connecting the pawl unit 164 to the gear 119. In assembling the pawl unit 164 onto the gear 119, the cam faces 169 are inserted into the hole 165, and by pushing the pawl 164 further into the space within the rim 158, the pawl 164 is coupled for pivotal movement as shown in FIG. 17. The pawl unit 164 includes a pawl 164' having an integral projection or post 170 which can move to a limited extent in a slot 171. The projection 170 can cooperate with a stop face 172 to limit the travel of the pawl 164'. Without a means to limit the pivotal movement of the pawl 164' it would be more difficult to assemble the pawl unit 164 with the ratchet wheel 133 because the pawl unit 164 could assume any of a wide variety of positions. Once the pawl unit 164 is assembled into cooperative relationship with respect to the ratchet wheel 133, the ratchet wheel 133 holds the pawl unit 164 in a position in which the projection 170 is out of contact with the stop face 172. However, if the gear is disassembled so that the pawl 164 is moved out of contact with the ratchet wheel 133, the stop face 172 again cooperates with the post 170. Formed integrally with the pawl 164' is a leaf spring or spring finger 173. The leaf spring 173 is connected to the pawl 164' adjacent the pawl tooth 174 and the other end portion of the leaf spring 173 contacts the underside of the rim 158. The spring 173 urges the pawl tooth 174 into the path of the teeth 133'. It is seen that the pawl unit 164 is disposed almost entirely within the space defined by the rim 158.

When the user actuates the actuator 113, the gear segments 116 and 117 rotate gears 118 and 119 which move the print head 120 into printing cooperation with the platen 85, and the pawl tooth 174 moves into position to cooperate with the next tooth 133' on the ratchet wheel 133. When the user releases the actuator 113 the resilient device 123 urges the actuator clockwise as viewed in FIG. 3 to return the print head 120 to its initial position shown in FIG. 3 and to drive the pawl 164' to advance the ratchet wheel 113 and hence the feed wheel 69.

Figure 22:
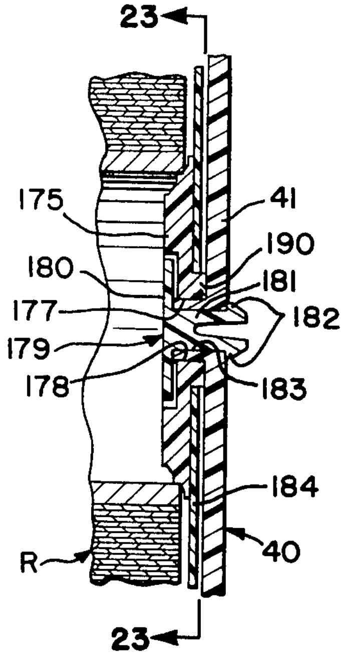
FIG 22 is a sectional view showing the mounting structure for one side of a label roll.
Figure 21:
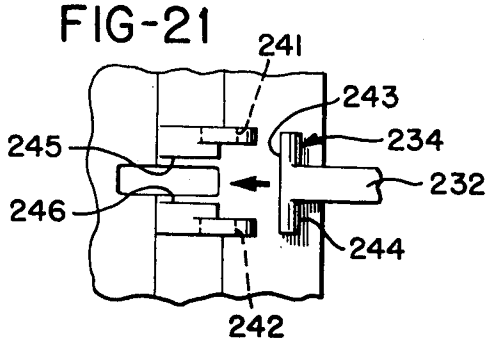
FIG. 21 is a view showing fragmentary portions of the carrier and leaf spring before they are connected to each other.
Figure 23:
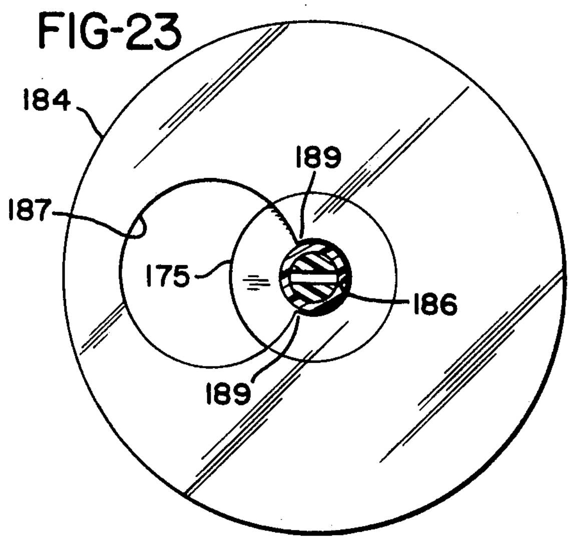
FIG. 23 is a view taken generally along a line 23—23 of FIG. 22.

With reference especially to FIGS. 1, 22 and 23, the label roll R is shown to be mounted for rotation on hub members 175 and 176. The hub members 175 and 176 are mounted on leaf springs 41' and 42' formed integrally with subframe sections 41 and 42. The hub members 175 and 176 are identical. Hence, only the hub member 175 will be discussed in detail. The hub member 175 is generally disc-shaped and has an annular hole 177. The leaf springs 41' has an annular flange 178 received in the hole 177 for rotatably mounting the hub member 175. The hub member 175 is retained on the flange 178 by a retainer generally indicated at 179. The retainer includes an annular disc-shaped portion 180 and a split shaft or post 181 having a pair of projections 182. The shaft 181 can be inserted through a hole 183 to the position shown in FIG. 22 and the projections 182 hold the retainer 179 in the assembled position. A pair of identical discs or side plates 184 and 185 are used to support the sides of the roll R so that the roll R does not telescope. The discs 184 and 185 can be assembled onto the apparatus even after the retainers 179 are in place. The disc 185, for example, has a pair of holes 186 and 187 which communicate with each other at a gap 188. The gap 188 is defined by projections 189. The hole 186 extends through more than 180° but substantially less than 360°. The hole 187 is at least slightly larger in diameter than the outside diameter of the hub member 175. The hub member 175 can be inserted through the hole 187 and thereupon the disc 184 can be shifted until a boss 190 on the hub member 175 deflects the projection 189 and is received in the hole 186. The disc 184 is composed of a resilient material, preferably a thin sheet of transparent plastics material. The disc 184 can be assembled onto the apparatus after the hub member 175 and the retainer 179 are in their assembled position, even though the outer periphery of the disc 184 is continuous.

With reference to FIGS. 1, 3, and 6 through 9, there is shown a movable body section or cover generally indicated at 191 for mounting an inking mechanism generally indicated at 192. The cover 191 is pivotally mounted on the posts or shafts 34 and 34'. The post 34 together with the post 34' can be considered to be a post or shaft. The cover 191 is a pair of spaced side walls 193 and 194 joined by a panel 195. The section 191 has a pair of spaced apart arms 196 and 197 which are bifurcated and which have snap sockets 198 and 199. The snap sockets 198 and 199 have aligned sockets 200 which are annular in configuration and which extend through more than 180° but substantially less than 360° as shown. The sockets 200 are axially aligned and can receive the respective posts 34 and 34'. It is apparent that the cover 191 can move between a normally closed position shown in FIG. 3 and an open position shown in FIG. 6. The section 191 can be easily assembled onto the posts 34 and 34' and the user can remove the entire cover 191 and replace the entire inking mechanism, if desired. The panel 195 has a pair of slots or cutouts 201 and 202 to enable the knobs 129 and 130, which are part of the print head 120, to move as the print head 120 moves between the initial or rest position shown in FIG. 3 and the printing position in which the print head 120 cooperates with the platen 85. The cover 191 can be readily latched in the closed position by latch assembly 76. The assembly 76 is formed in part by projections 204 on the cover 191 which have respective cam faces 205 which terminate at shoulders 206. The assembly 76 is also formed in part by the latch 76'. When the cover 191 is moved to the closed position, the cam faces 205 contact cam face 207 on the bar 76'' thereby causing the leaf spring 77 to bend as the bar 76'' moves generally to the right as shown in FIG. 3. When the shoulders 206 have cleared the cam face 207 they move into underlying relationship with respect to the bar 76'' and the leaf spring 77 returns the bar 76'' to the position shown in FIG. 3. The cover 191 is now latched in the closed position. To unlatch the latch assembly 76, the user manually engages the projections 78 and 79 and moves them rearwardly away from the front of the apparatus 30. When the shoulders 206 are clear of the bar 76'' the cover 191 can be pivoted to the open position.

Figure 10:
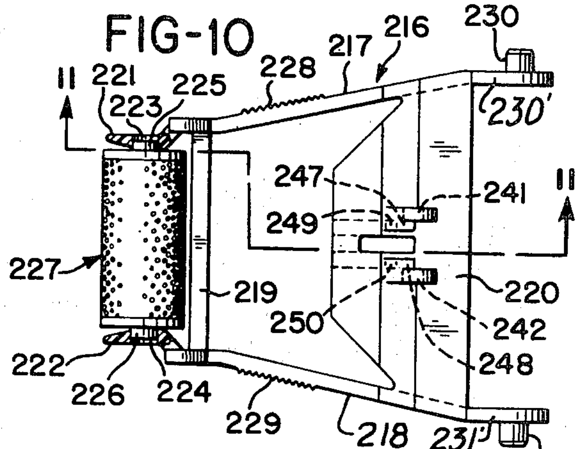
FIG. 10 is a top plan view of an ink roller and its carrier.
Figure 11:
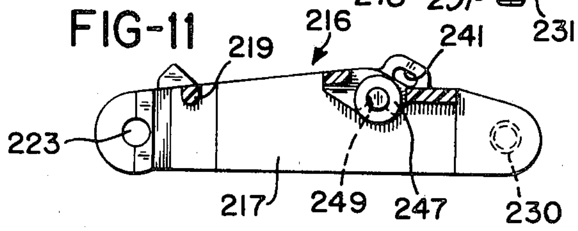
FIG. 11 is a sectional view taken generally along line 11—11 of FIG. 10.
Figure 12:
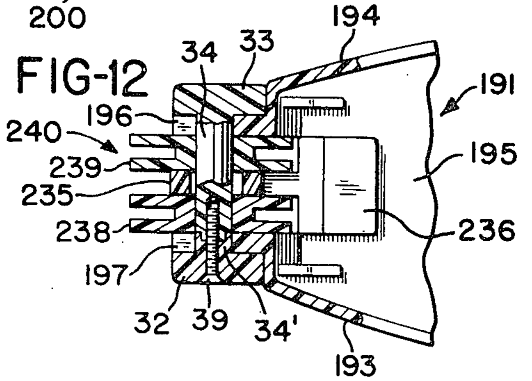
FIG. 12 is a sectional view taken along line 12—12 of FIG. 3.
Figure 13:
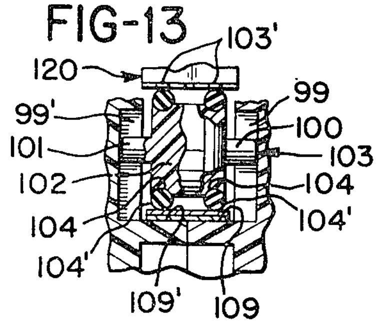
FIG. 13 is a partly sectional view taken along line 13—13 of FIG. 3.

The cover 191 has a pair of dove-tail slots 208 and 209. The slots 208 and 209 can slidably receive mating dove-tail bearing blocks 210 and 211. The bearing blocks have respective aligned holes 212 and 213. When the blocks 210 and 211 are slid into their respective slots 208 and 209 shallow projections 214 and 215 respectively project slightly into the respective holes 212 and 213. There is enough resiliency in the materials of which the cover 191 and the bearing blocks 210 and 211 are composed to let the bearing blocks 210 and 211 slide into place to a position in which the projections 214 and 215 extend into respective holes 212 and 213. An inker body or carrier generally indicated at 216 and shown in considerable detail in FIGS. 10 and 11 has a pair of side members 217 and 218 and a pair of transverse members 219 and 220. Arms 221 and 222 are connected to the respective side members 217 and 218. The arms 221 and 222 have respective aligned holes 223 and 224 for receiving respective stub ends 225 and 226 of ink roller 227. The side members are roughened as indicated at 228 and 229. When it is desired to remove the ink roller 227 the side members 217 and 218 are grasped by and between the thumb and index fingers at the roughening 228 and 229 and squeezed so that the arms 221 and 222 spread apart. The stub ends 225 and 226 will accordingly fall out of the respective holes 223 and 224 and a new ink roller 227 can be mounted to the arms 221 and 222 by simply squeezing the side members 217 and 218 to spread the arms 221 and 222 to receive the stub ends 225 and 226. The side members 217 and 218 diverge outwardly and have outwardly extending aligned mounting portions 230 and 231, on arms 230' and 231', received in the holes 212 and 213. The mounting portions 230 and 231 are received in the respective holes 212 and 213 of bearing blocks 210 and 211 while the bearing blocks 210 and 211 are slid into slots 208 and 209. Thereafter the carrier 216 is swung into the position shown in FIG. 3. In this position the arm 230' is disposed for movement between the surface 208' and interference member 201' on the panel 195 and the arm 231' is disposed for movement between the surface 209' and interference member 202' on the panel 195 so that the carrier 216 cannot be disconnected from the cover section, as when the labeler 30 is dropped. With reference to FIGS. 1 and 3, a spring member generally indicated at 232 includes a leaf spring or spring finger 233, a transverse connector or member 234 disposed at one end portion of the leaf spring 233, a mounting portion 235 disposed at the other end portion of the leaf spring 233, and another mounting portion 236. The mounting portion 236 is bifurcated and receives an end portion of the panel 195. The mounting portion 235 has an elongated slot 237 which receives the post 34 to provide a pin-and-slot connection. The mounting portion 235 is disposed between rolls 238 and 239 of an applicator roll 240. As best shown in FIG. 12, the rolls 238 and 239 straddle the mounting portion 235 and the arms 196 and 197 straddle the rolls 238 and 239 and the mounting portion 235. The transverse member 234 is received in aligned elongated holes 241 and 242 of a pin-and-slot connection. The transverse member 234 has oppositely extending transverse portions 243 and 244. The transverse portion 243 extends into the hole 241 and the transverse portion 244 extends into the hole 242. The transverse portion 243, for example, can be inserted into the hole 241 while the transverse member 234 is canted with respect to the axis of the holes 241 and 242 and moved into position and thereafter the other transverse portion 244 is moved into alignment with the hole 242. When the transverse portions 243 and 244 are received in respective holes 241 and 242, the spring 232 can be brought to its normal position in which the sides of the spring 232 are disposed between opposed shoulders 245 and 246 which limit the lateral movement of the transverse member 234. The transverse portions 243 and 244 are long enough to prevent them from coming out of the respective holes 241 and 242 when the shoulders 245 and 246 cooperate with the sides of the spring 232.

In the initial or rest position of the print head 120, the spring member 232 urges the carrier 216 to the solid line position shown in FIG. 3. The carrier 216 has a pair of spaced-apart snap sockets 247 and 248 (FIGS. 10 and 11) having aligned openings 249 and 250. Stub ends 251 and 252 (FIG. 1) of a roller 253 are received in respective openings 249 and 250. The openings 249 and 250 extend through more than 180° but substantially less than 360° so that the stub ends 251 and 252 can be snapped into them. The print head 120 carries a cam generally indicated at 254 with a dwell portion 255, a relatively steep ramp 256, and another dwell portion 257. The ink roller 227 is shown to be spaced from the print head 120 in FIG. 3, when the roller 253 bears against the dwell portion 255. When the print head 120 moves toward the ink roller 227, the endmost printing members 127 and 128 contact the ink roller 227. About that time, with continued movement of the print head 120, the roller 253 rolls in contact with the ramp 256 to pivot the carrier 216 clockwise as viewed in FIG. 3. When the print head 120 is in printing cooperation with the label L on the platen 85, the carrier 216 and the ink roller 227 which it carries are in the position indicated by phantom lines PL'. When the print head 120 is in printing cooperation with the label L, the roller 253 is in contact with the dwell portion 257. As the print head 120 is returned to its rest or initial position, the roller 253 moves out of contact with the dwell portion 257, thereafter the roller 253 rolls along the ramp 256, and thereafter the roller 253 rolls onto the dwell portion 255 until the carrier 216 and its roller 227 are returned to the initial position. Because the carrier 216 moves on fixed pivots, a lost-motion connection is provided by the elongated holes 241 and 242 and a lost-motion connection is also provided by enlarged hole 237 in the mounting portion 235.

In operation, a label roll R is loaded onto the hub members 175 and 176 between the discs 184 and 185. The roll R consists of the composite web C composed of a web of supporting material S to which the labels L are releasably adhered by pressure sensitive adhesive A. The leading marginal end of the composite web C is passed over the resilient device 105, and between the brake roller 102 and the surfaces 109 and 109'. It is preferred to squeeze the actuator 113 slightly while the leading marginal end is being threaded through the labeler so that the print head 120 is moved away from the initial position to release the brake 102 and so that the brake roller 102 does not exert a braking force on the composite web C. The leading end portion of the composite web C is passed along the guideway provided by guides 49 and 49'. The composite web C then passes out of the front of the apparatus adjacent the roller 54 and thereupon the user inserts the composite web C between the platen 85 and the hold-down member 93. The guide portion 94 guides the composite web out of the apparatus to a position where it can be grasped by the user who will pull on the composite web C to draw several additional inches off the roll R. The composite web C is thereupon passed around the roller 53, and with the actuator 113 preferably in the fully squeezed or fully operated position, the leading end of the composite web C is inserted between the die roller 66 and the feed wheel 69. When the actuator 113 is released, the teeth 68 break through a frangible portion FS on the supporting material web S and the related frangible portion FL of the label material L. Repeated actuation of the actuator 113 will cause any slack to be taken out of the web S and thereupon labels L will be dispensed into label applying relationship with the applicator 240 as shown in FIG. 3. In this position the trailing marginal end of the leading label L is still adhered to the web S. When the user applies the label L, the label L being applied is pulled from the web S. The brake 103 is effective to prevent the composite web C from being paid out of the roll R during application of a label L and an anti-backup pawl unit 164 (FIG. 1) which cooperates with the ratchet wheel 133 obviates loss of tension in the web S.

When it is desired to replace an ink roller 227, the user pulls on the knobs 78 and 79 to move the bar 76" away from the shoulders 206 on the cover section 191. The user can thereupon pivot the cover section 191 to the open position shown in FIG. 6. By squeezing the side members 228 and 229, the spent ink roller falls out of the holes 223 and 224. A new ink roller can be inserted by squeezing the side members 228 and 229 so that the holes 223 and 224 can receive the stub ends 225 and 226 of a fresh ink roller. Thereupon the user returns the cover section 191 to the position shown in FIG. 3. The cams or cam faces 205 on the cover cooperate with the cam face 207 of the bar 76", thereby deflecting the leaf spring 77 until the cover section 191 is latched in the position shown in FIG. 3.

Other embodiments and modifications of this invention will suggest themselves to those skilled in the art, and all such of these as come within the spirit of this invention are included within its scope as best defined by the appended claims.

I claim:

1. Hand-held apparatus for printing and applying pressure sensitive labels releasably secured to a web of supporting material, comprising: a body having a handle, a manually operable actuator disposed at the handle, a platen, a print head cooperable with the platen for printing on successive labels, means responsive to movement of the actuator for moving the print head into printing cooperation with the platen and for advancing the web, a shaft mounted by the body, an applicator mounted on the shaft, the body having a body section pivotally mounted on the shaft and movable between open and closed positions, an inker for the print head disposed in the space within the body, and means for releasably latching the body section to the body in the closed position.

2. Hand-held apparatus for printing and applying pressure sensitive labels releasably secured to a web of supporting material, comprising: a body having a handle, a manually operable actuator disposed at the handle, a platen, a print head cooperable with the platen for printing on successive labels, means responsive to movement of the actuator for moving the print head into printing cooperation with the platen and for advancing the web, a shaft mounted by the body, an applicator mounted on the shaft, the body having a body section pivotally mounted on the shaft and movable between open and closed positions, an inker for the print head disposed in the space within the body, wherein the inker includes a carrier pivotally mounted to the body section, an ink roller carried by the carrier and cooperable with the print head, spring means connected to the shaft and acting on the carrier for urging the carrier toward the print head to cause the ink roller to move into the path of movement of the print head, and means for releasably latching the body section to the body in the closed position.

3. Hand-held apparatus for printing and applying pressure sensitive labels releasably secured to a web of supporting material, comprising: a body having a handle, a manually operable actuator disposed at the handle, a platen, a print head cooperable with the platen for printing on successive labels, means responsive to movement of the actuator for moving the print head into printing cooperation with the platen and for advancing the web, a shaft mounted by the body, an applicator mounted on the shaft, the applicator including a roll received on the shaft between the arms, the body having a body section pivotally mounted on the shaft and movable between open and closed positions, the body section having spaced-apart arms having apertures for receiving the shaft, an inker for the print head disposed in the space within the body, and means for releasably latching the body section to the body in the closed position.

4. Hand-held apparatus for printing and applying pressure sensitive labels releasably secured to a web of supporting material, comprising: a body having a handle, a manually operable actuator disposed at the handle, a platen, a print head cooperable with the platen for printing on successive labels, means responsive to movement of the actuator for moving the print head into printing cooperation with the platen and for advancing the web, a shaft mounted by the body, an applicator mounted on the shaft, the body having a body section pivotally mounted on the shaft and movable between open and closed positions, the body section including spaced-apart arms having respective open-end slots for receiving the shaft, the slots enabling the body section to be removed from the remainder of the body only when the body section is in the open position, an inker for the print head disposed in the space within the body, and means for releasably latching the body section to the body in the closed position.

5. Hand-held apparatus for printing and applying pressure sensitive labels releasably secured to a web of supporting material, comprising: a body having a handle, a manually operable actuator disposed at the handle, a platen, a print head cooperable with the platen for printing on successive labels, means responsive to movement of the actuator for moving the print head into printing cooperation with the platen and for advancing the web, a shaft mounted by the body, an applicator mounted on the shaft, the body having a body section pivotally mounted on the shaft and movable between open and closed positions, the body section including spaced-apart arms having respective open-end slots for receiving the shaft, the slots enabling the body section to be removed from the remainder of the body only when the body section is in the open position, the applicator including a roll received on the shaft between the arms, an inker for the print head disposed in the space within the body, and means for releasably latching the body section to the body in the closed position.

6. Hand-held apparatus for printing and applying pressure sensitive labels releasably secured to a web of supporting material, comprising: a body having a handle, a manually operable actuator disposed at the handle, a platen mounted by the body, a print head cooperable with the platen for printing on successive labels, means responsive to movement of the actuator for moving the print head into printing cooperation with the platen and for advancing the web, means for delaminating printed labels, a shaft mounted by the body, an applicator mounted on the shaft, the body having a pivotally mounted body section movable between open and closed positions, an inker for the print head disposed in the space within the body, the inker including a carrier pivotally mounted to the body section, an ink roller carried by the carrier and cooperable with the print head, a spring member connected to the shaft and acting on the carrier for urging the carrier toward the print head to cause the ink roller to move into the path of movement of the print head, and means for releasably latching the body section to the body.

7. Hand-held apparatus for printing and applying pressure sensitive labels releasably secured to a web of supporting material, comprising: a body having a handle, a manually operable actuator disposed at the handle, a platen mounted by the body, a print head cooperable with the platen for printing on successive labels, means responsive to movement of the actuator for moving the print head into printing cooperation with the platen and for advancing the web, means for delaminating printed labels, a shaft mounted by the body, an applicator mounted on the shaft, the body having a pivotally mounted body section movable between open and closed positions, an inker for the print head disposed in the space within the body, the inker including a carrier pivotally mounted to the body section, an ink roller carried by the carrier and cooperable with the print head, a spring member connected to the shaft and acting on the carrier for urging the carrier toward the print head to cause the ink roller to move into the path of movement of the print head, wherein the spring member includes an elongated spring finger connected at its one end portion to the carrier, an apertured portion for receiving the shaft and connected to the other end portion of the spring finger, an extension connected to the apertured portion and bearing against the body section to counteract force exerted by the carrier on the spring finger, and means for releasably latching the body section to the body.

8. Hand-held apparatus for printing and applying pressure sensitive labels releasably secured to a web of supporting material, comprising: a body having a handle, a manually operable actuator disposed at the handle, a platen mounted by the body, a print head cooperable with the platen for printing on successive labels, means responsive to movement of the actuator for moving the print head into printing cooperation with the platen and for advancing the web, means for delaminating printed labels, a shaft mounted by the body, an applicator mounted on the shaft, the body having a pivotally mounted body section movable between open and closed positions, an inker for the print head disposed in the space within the body, the inker including a carrier pivotally mounted to the body section, an ink roller carried by the carrier and cooperable with the print head, a spring member connected to the shaft and acting on the carrier for urging the carrier toward the print head to cause the ink roller to move into the path of movement of the print head, wherein the spring member includes an elongated spring finger connected at its one end portion to the carrier, an apertured portion for receiving the shaft and connected to the other end portion of the spring finger, an extension connected to the apertured portion and bearing against the body section to counteract force exerted by the carrier on the spring finger, wherein the spring member is of one-piece molded plastics construction, and means for releasably latching the body section to the body.

9. Hand-held apparatus for printing and applying pressure sensitive labels releasably secured to a web of supporting material, comprising: a body having a handle, a manually operable actuator disposed at the handle, a platen mounted by the body, a print head cooperable with the platen for printing on successive labels, means responsive to movement of the actuator for moving the print head into printing cooperation with the platen and for advancing the web, means for delaminating printed labels, a shaft mounted by the body, an applicator mounted on the shaft, the body having a pivotally mounted body section movable between open and closed positions, an inker for the print head disposed in the space within the body, the inker including a carrier pivotally mounted to the body section, an ink roller carried by the carrier and cooperable with the print head, a spring member connected to the shaft and acting on the carrier for urging the carrier toward the print head to cause the ink roller to move into the path of movement of the print head, wherein the spring member includes an elongated spring finger connected at its one end portion to the carrier, an apertured portion for receiving the shaft and connected to the other end portion of the spring finger, wherein the apertured portion has an elongated slot, and an extension connected to the apertured portion and bearing against the body section to counteract force exerted by the carrier on the spring finger, wherein the body section has at least one slot, the print head has a selector extending through the slot, and means for releasably latching the body section to the body.

10. Hand-held apparatus for printing and applying pressure sensitive labels releasably secured to a web of supporting material, comprising: a body having a handle, a manually operable actuator disposed at the handle, a platen mounted by the body, a print head cooperable with the platen for printing on successive labels, means responsive to movement of the actuator for moving the print head into printing cooperation with the platen and for advancing the web, means for delaminating printed labels, a shaft mounted by the body, an applicator mounted on the shaft, the body having a pivotally mounted body section movable between open and closed positions, an inker for the print head disposed in the space within the body, the inker including a carrier pivotally mounted to the body section, an ink roller carried by the carrier and cooperable with the print head, a spring member connected to the shaft and acting on the carrier for urging the carrier toward the print head to cause the ink roller to move into the path of movement of the print head, wherein the spring member includes an elongated spring finger connected at its one end portion to the carrier, an apertured portion for receiving the shaft and connected to the other end portion of the spring finger, wherein the applicator includes spaced-apart rolls received on the shaft, the apertured portion being disposed in the space between adjacent rolls, and means for releadably latching the body section to the body.

11. Hand-held apparatus for printing and applying pressure sensitive labels releasably secured to a web of supporting material, comprising: a body having a handle, a manually operable actuator disposed at the handle, a platen mounted by the body, a print head cooperable with the platen for printing on successive labels, means responsive to movement of the actuator for moving the print head into printing cooperation with the platen and for advancing the web, an applicator for applying printed labels, a shaft mounted by the body, the body having a body section pivotally mounted by the shaft and movable between open and closed positions, an inker for the print head disposed in the space within the body, the inker including a carrier pivotally mounted to the body section, an ink roller carried by the carrier and cooperable with the print head, a spring member connected to the shaft and acting on the carrier for urging the carrier toward the print head to cause the ink roller to move into the path of movement of the print head, and means for releasably latching the body section to the body.

12. Hand-held apparatus for printing and applying pressure sensitive labels releasably secured to a web of supporting material, comprising: a body having a handle, a manually operable actuator disposed at the handle, a platen mounted by the body, a print head cooperable with the platen for printing on successive labels, means responsive to movement of the actuator for moving the print head into printing cooperation with the platen and for advancing the web, an applicator for applying printed labels, a shaft mounted by the body, the body having a body section pivotally mounted by the shaft and movable between open and closed positions, an inker for the print head disposed in the space within the body, the inker including a carrier pivotally mounted to the body section, an ink roller carried by the carrier and cooperable with the print head, a spring member connected to the shaft and acting on the carrier for urging the carrier toward the print head to cause the ink roller to move into the path of movement of the print head, wherein the spring member includes an apertured portion for receiving the shaft, wherein the applicator includes spaced-apart rolls, wherein the apertured portion is disposed between adjacent rolls, and means for releasably latching the body section to the body.

13. Hand-held apparatus for printing and applying pressure sensitive labels releasably secured to a web of supporting material, comprising: a body having a handle, a manually operable actuator disposed at the handle, a platen mounted by the body, a print head cooperable with the platen for printing on successive labels, means responsive to movement of the actuator for moving the print head into printing cooperation with the platen and for advancing the web, means for delaminating printed labels, means for applying the delaminated labels, a traveling inker including a carrier pivotally mounted to the body, an ink roll carried by the carrier and cooperable with the print head, a spring member mounted to the body and acting on and movable relative to the carrier, a roller mounted on the carrier, a cam on the print head cooperable with the roller, and the spring member causing the roller to follow the contour of the cam.

14. Hand-held apparatus for printing and applying pressure sensitive labels releasably secured to a web of supporting material, comprising: a body having a handle, a manually operable actuator disposed at the handle, a platen mounted by the body, a print head cooperable with the platen for printing on successive labels, means responsive to movement of the actuator for moving the print head into printing cooperation with the platen and for advancing the web, means for delaminating printed labels, means for applying the delaminated labels, a traveling inker including a carrier pivotally mounted to the body, an ink roll carried by the carrier and cooperable with the print head, a spring member mounted to the body and acting on and movable relative to the carrier, wherein the body has a shaft, wherein the spring member is connected to the shaft, a roller mounted on the carrier, a cam on the print head cooperable with the roller, and the spring member causing the roller to follow the contour of the cam.

15. Hand-held apparatus for printing and applying pressure sensitive labels releasably secured to a web of supporting material, comprising: a frame having a handle, a manually operable actuator disposed at the handle, a subframe disposed in the space within and connected to the frame, a platen mounted on the subframe, a print head mounted on the subframe and cooperable with the platen for printing on successive labels, means responsive to movement of the actuator for moving the print head into printing cooperation with the platen and for advancing the web, a shaft mounted on the frame, an applicator mounted on the shaft, the frame having a movable section pivotally mounted on the shaft and movable between a normally closed position and an open position, an inker for the print head disposed in the space within the frame, and means for releasably latching the movable section in the closed position.

16. Hand-held apparatus for printing and applying pressure sensitive labels releasably secured to a web of supporting material, comprising: a frame having a handle, a manually operable actuator disposed at the handle, a subframe disposed in the space within and connected to the frame, wherein the subframe has a pair of substantially mirror image side-by-side subframe sections, a platen mounted on the subframe, a print head mounted on the subframe and cooperable with the platen for printing on successive labels, means responsive to movement of the actuator for moving the print head into printing cooperation with the platen and for advancing the web, a shaft mounted on the frame, an applicator mounted on the shaft, the frame having a movable section pivotally mounted on the shaft and movable between a normally closed position and an open position, an inker for the print head disposed in the space within the frame, and means for releasably latching the movable section in the closed position, the latching means including a latch anchored to the subframe and accessible from outside the frame for releasably holding the movable section in the closed position.

17. Hand-held apparatus for printing and applying pressure sensitive labels releasably secured to a web of supporting material, comprising: a frame having a handle, a manually operable actuator disposed at the handle, a subframe disposed in the space within and connected to the frame, a platen mounted on the subframe, a print head mounted on the subframe and cooperable with the platen for printing on successive labels, means responsive to movement of the actuator for moving the print head into printing cooperation with the platen and for advancing the web, a shaft mounted on the frame, an applicator mounted on the shaft, the frame having a movable section pivotally mounted on the shaft and movable between a normally closed position and an open position, an inker for the print head disposed in the space within the frame, and means for releasably latching the movable section in the closed position, wherein the latching means includes a latch anchored to the subframe and accessible from outside the frame for releasably holding the frame section in the closed position.

18. Hand-held apparatus for printing and applying pressure sensitive labels releasably secured to a web of supporting material, comprising: a frame having a handle, a manually operable actuator disposed at the handle, a subframe disposed in the space within and connected to the frame, a platen mounted on the subframe, a print head mounted on the subframe and cooperable with the platen for printing on successive labels, means responsive to movement of the actuator for moving the print head into printing cooperation with the platen, and means for delaminating printed labels, a shaft mounted by the frame, an applicator mounted on the shaft, the frame having a movable section pivotally mounted for movement between a normally closed position and an open position, an inker for the print head disposed in the space within the frame, the inker including a carrier pivotally mounted to the movable section, an ink roller carried by the carrier and cooperable with the print head, a spring member connected to the shaft and acting on the carrier for urging the carrier toward the print head to cause the ink roller to move into the path of movement of the print head, and means for releasably latching the movable section in the closed position.

19. Hand-held apparatus for printing and applying pressure sensitive labels releasably secured to a web of supporting material, comprising: a frame having a handle, a manually operable actuator disposed at the handle, a subframe disposed in the space within and connected to the frame, wherein the subframe has a pair of substantially mirror-image side-by-side subframe sections, a platen mounted on the subframe, a print head mounted on the subframe and cooperable with the platen for printing on successive labels, means responsive to movement of the actuator for moving the print head into printing cooperation with the platen, and means for delaminating printed labels, a shaft mounted by the frame, an applicator mounted on the shaft, the frame having a movable section pivotally mounted for movement between a normally closed position and an open position, an inker for the print head disposed in the space within the frame, the inker including a carrier pivotally mounted to the movable section, an ink roller carried by the carrier and cooperable with the print head, a spring member connected to the shaft and acting on the carrier for urging the carrier toward the print head to cause the ink roller to move into the path of movement of the print head, and means for releasably latching the movable section in the closed position, the latching means including a latch anchored to the subframe and accessible from outside the frame for releasably holding the movable section in the closed position.

20. Hand-held apparatus for printing and applying pressure sensitive labels releasably secured to a web of supporting material, comprising: a frame having a handle, a manually operable actuator disposed at the handle, a subframe disposed in the space within and connected to the frame, a platen mounted on the subframe, a print head mounted on the subframe and cooperable with the platen for printing on successive labels, means responsive to movement of the actuator for moving the print head into printing cooperation with the platen, and means for delaminating printed labels, a shaft mounted by the frame, an applicator mounted on the shaft, the frame having a movable section pivotally mounted for movement between a normally closed position and an open position, an inker for the print head disposed in the space within the frame, the inker including a carrier pivotally mounted to the movable section, an ink roller carried by the carrier and cooperable with the print head, a spring member connected to the shaft and acting on the carrier for urging the carrier toward the print head to cause the ink roller to move into the path of movement of the print head, and means for releasably latching the movable section in the closed position, wherein the latching means includes a latch anchored to the subframe and accessible from outside the frame for releasably holding the movable section in the closed position.

21. Hand-held apparatus for printing and applying pressure sensitive labels releasably secured to a web of supporting material, comprising: a frame having a handle, a manually operable actuator disposed at the handle, a subframe disposed in the space within and connected to the frame, a platen mounted on the subframe, a print head mounted on the subframe and cooperable with the platen for printing on successive labels, means responsive to movement of the actuator for moving the print head into printing cooperation with the platen and for advancing the web, an applicator for applying printed labels, a shaft mounted by the frame, the frame having a movable section pivotally mounted by the shaft and movable between a normally closed position and an open position, an inker for the print head disposed in the space within the frame, the inker including a carrier pivotally mounted to the movable section, an inker roller carried by the carrier and cooperable with the print head, a spring member connected to the shaft and acting on the carrier shaft and acting on the carrier for urging the carrier toward the print head to cause the ink roller to move into the path of movement of the print head, and means for releasably latching the movable section in the closed position.

22. Hand-held apparatus for printing and applying pressure sensitive labels releasably secured to a web of supporting material, comprising: a frame having a handle, a manually operable actuator disposed at the handle, a subframe disposed in the space within and connected to the frame, wherein the subframe has a pair of substantially mirror-image side-by-side subframe sections, a platen mounted on the subframe, a print head mounted on the subframe and cooperable with the platen for printing on successive labels, means responsive to movement of the actuator for moving the print head into printing cooperation with the platen and for advancing the web, an applicator for applying printed labels, a shaft mounted by the frame, the frame having a movable section pivotally mounted by the shaft and movable between a normally closed position and an open position, an inker for the print head disposed in the space within the frame, the inker including a carrier pivotally mounted to the movable section, an ink roller carried by the carrier and cooperable with the print head, a spring member connected to the shaft and acting on the carrier shaft and acting on the carrier for urging the carrier toward the print head to cause the ink roller to move into the path of movement of the print head, and means for releasably latching the movable section in the closed position, the latching means including a latch anchored to the subframe and accessible from outside the frame for releasably holding the movable section in the closed position.

23. Hand-held apparatus for printing and applying pressure sensitive labels releasably secured to a web of supporting material, comprising: a frame having a handle, a manually operable actuator disposed at the handle, a subframe disposed in the space within and connected to the frame, a platen mounted on the subframe, a print head mounted on the subframe and cooperable with the platen for printing on successive labels, means responsive to movement of the actuator for moving the print head into printing cooperation with the platen and for advancing the web, an applicator for applying printed labels, a shaft mounted by the frame, the frame having a movable section pivotally mounted by the shaft and movable between a normally closed position and an open position, an inker for the print head disposed in the space within the frame, the inker including a carrier pivotally mounted to the movable section, an ink roller carried by the carrier and cooperable with the print head, a spring member connected to the shaft and acting on the carrier shaft and acting on the carrier for urging the carrier toward the print head to cause the ink roller to move into the path of movement of the print head, and means for releasably latching the movable section in the closed position, wherein the latching means includes a latch connected to the subframe and accessible from outside the frame for releasably holding the frame section in the closed position.

24. Hand-held apparatus for printing and applying pressure sensitive labels releasably secured to a web of supporting material, comprising: a frame having a handle, a manually operable actuator disposed at the handle, a subframe disposed in the space within and connected to the frame, a platen mounted on the subframe, a print head cooperable with the platen for printing on successive labels, rolling-contact bearing means movably mounting the print head to the subframe, means responsive to movement of the actuator for moving the print head into printing cooperation with the platen and for advancing the web, means for delaminating printed labels, means for applying the delaminated labels, a traveling inker including a carrier pivotally mounted to the frame, an ink roll carried by the carrier and cooperable with the print head, a spring member mounted to the frame and acting on and movable relative to the carrier, a roller mounted on the carrier, a cam on the print head cooperable with the roller, and the spring member causing the roller to follow the contour of the cam.

25. Hand-held apparatus for printing and applying pressure sensitive labels releasably secured to a web of supporting material, comprising: a frame having a handle, a manually operable actuator disposed at the handle, a subframe disposed in the space within and connected to the frame, a platen mounted on the subframe, a print head cooperable with the platen for printing on successive labels, means responsive to movement of the actuator for moving the print head into printing cooperation with the platen and for advancing the web, means for delaminating printed labels, means for applying the delaminated labels, a traveling inker including a carrier pivotally mounted on the frame, an ink roll carried by the carrier and cooperable with the print head, a spring member connected to the frame and movable relative to the carrier, and a pin-and-slot lost-motion connection between the spring member and the carrier.

26. Hand-held apparatus for printing and applying pressure sensitive labels releasably secured to a web of supporting material, comprising: a frame having a handle and a movable section, a manually operable actuator disposed at the handle, a subframe disposed in the space within and connected to the frame, a platen and a cooperable print head mounted on the subframe, means responsive to movement of the actuator for moving the print head into and out of printing cooperation and for advancing the web, an inker disposed in the space within the frame for inking the print head, the inker including a replaceable ink roller, means mounting the movable section for pivotal movement between a normally closed position and an open position to facilitate replacing a spent ink roller, means for delaminating printed labels from the web, means for applying the printed labels, a latch for releasably holding the movable section in the closed position, the latch including a flexible resilient member connected to the subframe, the movable section having means for engaging the flexible resilient member, and means accessible from outside the frame for flexing the flexible resilient member and unlatching the movable section.

27. Hand-held apparatus for printing and applying pressure sensitive labels releasably secured to a web of supporting material, comprising: a frame having a handle and a movable section, a manually operable actuator disposed at the handle, a subframe disposed in the space within and connected to the frame, a platen and a cooperable print head mounted on the subframe, means responsive to movement of the actuator for moving the print head into and out of printing cooperation and for advancing the web, an inker disposed in the space within the frame for inking the print head, the inker including a replaceable ink roller, means mounting the movable section for pivotal movement between a normally closed position and an open position to facilitate replacing a spent ink roller, means for delaminating printed labels from the web, means for applying the printed labels, a latch for releasably holding the movable section in the closed position, the latch including a flexible resilient member connected to the subframe, the movable section having means for engaging the flexible resilient member, means accessible from outside the frame for flexing the flexible resilient member and unlatching the movable section, wherein the subframe is comprised of mating subframe halves having means providing a guideway for the web, wherein the subframe halves have opposed recesses, the flexible resilient member including a leaf spring, a post connected to one end portion of the leaf spring and received in the recesses, a bar connected to the other end portion of the leaf spring, the movable section having a pair of members each terminating at a latch face, the latch faces being engaged by the bar when the movable section is in the closed position, the members having respective cam faces adjacent the latch faces for camming the bar and flexing the leaf spring when the movable section is being moved to the closed position to enable the latch faces to be received in engagement with the bar when the movable section is moved to the closed position, and wherein the latch is of one-piece molded plastics construction.

28. Hand-held apparatus for printing and applying pressure sensitive labels releasably secured to a web of supporting material, comprising: a frame having a handle and a movable section, a subframe disposed in the space within and connected to the body, a platen and a cooperable print head mounted on the subframe, an inker disposed within the frame for inking the print head, the inker including a replaceable ink roller, means pivotally mounting the movable section for movement between a normally closed position and an open position to facilitate replacing a spent ink roller, means for delaminating printed labels from the web, means for applying the printed labels, the subframe having a pair of substantially mirror-image side-by-side subframe sections, the frame having a pair of holes and a latch mounted to the subframe and having means projecting through the holes and accessible from outside the frame for releasably holding the frame section in the closed position.

29. Hand-held apparatus for printing and applying pressure sensitive labels, comprising: a frame having a handle and a movable section, means mounted by the frame for supporting a label roll composed of labels releasably secured to a web of supporting material, a manually operable actuator disposed at the handle, a platen, a print head cooperable with the platen, means disposed adjacent the platen for delaminating printed labels, means disposed adjacent the delaminating means for applying printed labels, means responsive to movement of the actuator for moving the print head into and out of cooperation with the platen and for advancing the web to advance a printed label into printing cooperation with the label applying means, and means for inking the print head, the inking means including an ink roller, a carrier for the ink roller mounted to the movable section for pivotal movement between a first position in which the carrier can be connected to and disconnected from the movable section and a second position in which the ink roller can move into and out of inking cooperation with the print head, means for preventing the carrier from being disconnected from the movable section while the carrier is in the second position, a leaf spring connecting the frame and the carrier, means for coupling the leaf spring to the carrier when the carrier is in the first position, and interference means for preventing the coupling means from becoming uncoupled when the carrier is in the second position.

30. Hand-held apparatus for printing and applying pressure sensitive labels, comprising: a frame having a handle and a movable section, means mounted by the frame for supporting a label roll composed of labels releasably secured to a web of supporting material, a manually operable actuator disposed at the handle, a platen, a print head cooperable with the platen, means disposed adjacent the platen for delaminating printed labels, means disposed adjacent the delaminating means for applying printed labels, means responsive to movement of the actuator for moving the print head into and out of cooperation with the platen and for advancing the web to advance a printed label into printing cooperation with the label applying means, and means for inking the print head, the inking means including an ink roller, a carrier for the ink roller mounted to the movable section for pivotal movement between a first position in which the carrier can be connected to and disconnected from the movable section and a second position in which the ink roller can move into and out of inking cooperation with the print head, means for preventing the carrier from being disconnected from the movable section while the carrier is in the second position, a leaf spring connecting the frame and the carrier, means for coupling the leaf spring to the carrier when the carrier is in the first position, wherein the coupling means includes a lost-motion connection between the carrier and the leaf spring, and interference means for preventing the coupling means from becoming uncoupled when the carrier is in the second position.

31. Hand-held apparatus for printing and applying pressure sensitive labels, comprising: a frame having a handle and a movable section, means mounted by the frame for supporting a label roll composed of labels releasably secured to a web of supporting material, a manually operable actuator disposed at the handle, a platen, a print head cooperable with the platen, means disposed adjacent the platen for delaminating printed labels, means disposed adjacent the delaminating means for applying printed labels, means responsive to movement of the actuator for moving the print head into and out of cooperation with the platen and for advancing the web to advance a printed label into printing cooperation with the label applying means, and means for inking the print head, the inking means including an ink roller, a carrier for the ink roller mounted to the movable section for pivotal movement between a first position in which the carrier can be connected to and disconnected from the frame section and a second position in which the ink roller can move into and out of inking cooperation with the print head, means for preventing the carrier from being disconnected from the movable section while the carrier is in the second position, a leaf spring connecting the frame and the carrier, means for coupling the leaf spring to the carrier when the carrier is in the first position, interference means for preventing the coupling means from becoming uncoupled when the carrier is in the second position, wherein the coupling means includes a pair of oppositely extending first and second projections connected to the leaf spring and means connected to the carrier providing a pair of spaced apart first and second apertures, the lateral distance between the apertures being less than the distance between the ends of the extensions but the ends of the projections being sufficiently close to each other to enable the first projection to be inserted into the first aperture and shifted into the first aperture to such an extent that the second projection can be brought into lateral alignment with the second aperture, and the interference means being effective when the carrier is in the second position for preventing the first and second projections from moving out of the respective first and second apertures.

32. Hand-held apparatus for printing and applying pressure sensitive labels, comprising: a frame having a handle and a movable section, means mounted by the frame for supporting a label roll composed of labels releasably secured to a web of supporting material, a manually operable actuator disposed at the handle, a platen, a print head cooperable with the platen, means disposed adjacent the platen for delaminating printed labels, means disposed adjacent the delaminating means for applying printed labels, means responsive to movement of the actuator for moving the print head into and out of cooperation with the platen and for advancing the web to advance a printed label into printing cooperation with the label applying means, and means for inking the print head, the inking means including an ink roller cooperable with the print head, a carrier for the ink roller, means for pivotally mounting the carrier to the frame, post means connected to the frame, a leaf spring connected to the carrier and to the post means, and the label applying means including an applicator roll mounted for rotation about the post means.

33. Hand-held apparatus for printing and applying pressure sensitive labels, comprising: a frame having a handle and a movable section, means mounted by the frame for supporting a label roll composed of labels releasably secured to a web of supporting material, a manually operable actuator disposed at the handle, a platen, a print head cooperable with the platen, means disposed adjacent the platen for delaminating printed labels, means disposed adjacent the delaminating means for applying printed labels, means responsive to movement of the actuator for moving the print head into and out of cooperation with the platen and for advancing the web to advance a printed label into printing cooperation with the label applying means, and means for inking the print head, the inking means including an ink roller cooperable with the print head, a carrier for the ink roller, means for pivotally mounting the carrier to the frame, post means connected to the frame, a leaf spring connected to the carrier and to the post means, an extension on the leaf spring for anchoring the leaf spring to the movable section, and the label applying means including an applicator roll mounted for rotation about the post means.

34. Hand-held apparatus for printing and applying pressure sensitive labels, comprising: a frame having a handle and a movable section, means mounted by the frame for supporting a label roll composed of labels releasably secured to a web of supporting material, a manually operable actuator disposed at the handle, a platen, a print head cooperable with the platen, means disposed adjacent the platen for delaminating printed labels, means disposed adjacent the delaminating means for applying printed labels, means responsive to movement of the actuator for moving the print head into and out of cooperation with the platen and for advancing the web to advance a printed label into printing cooperation with the label applying means, and means for inking the print head, the inking means including an ink roller cooperable with the print head, a carrier for the ink roller, means for pivotally mounting the carrier to the frame, post means connected to the frame, a leaf spring connected to the carrier and to the post means, the leaf spring including a spring mounting section having an aperture for receiving the post, the aperture being sized to provide lost motion between the mounting section and the post, the mounting section further including an extension anchored to the frame, and the label applying means including an applicator roll mounted for rotation about the post means.

35. Hand-held apparatus for printing and applying pressure sensitive labels, comprising: a frame having a handle and a movable section, means mounted by the frame for supporting a label roll composed of labels releasably secured to a web of supporting material, a manually operable actuator disposed at the handle, a platen, a print head cooperable with the platen, means disposed adjacent the platen for delaminating printed labels, means disposed adjacent the delaminating means for applying printed labels, means responsive to movement of the actuator for moving the print head into and out of cooperation with the platen and for advancing the web to advance a printed label into printing cooperation with the label applying means, and means for inking the print head, the inking means including an ink roller cooperable with the print head, a carrier for the ink roller, means for pivotally mounting the carrier to the frame, post means connected to the frame, a leaf spring connected to the carrier and to the post means, the leaf spring including a spring mounting section having an aperture for receiving the post, the aperture being sized to provide lost motion between the mounting section and the post, the mounting section further including an extension anchored to the frame, wherein the carrier is of one-piece molded plastics construction, and wherein the leaf spring is of one-piece molded plastics construction, and the label applying means including an applicator roll mounted for rotation about the post means.

36. Hand-held apparatus for printing and applying pressure sensitive labels, comprising: a frame having a handle and a movable section, means mounted by the frame for supporting a label roll composed of labels releasably secured to a web of supporting material, a manually operable actuator disposed at the handle, a platen, a print head cooperable with the platen, means disposed adjacent the platen for delaminating printed labels, means disposed adjacent the delaminating means for applying printed labels, means responsive to movement of the actuator for moving the print head into and out of cooperation with the platen and for advancing the web to advance a printed label into printing cooperation with the label applying means, and means for inking the print head, the inking means including an ink roller cooperable with the print head, a carrier for the ink roller, means for pivotally mounting the carrier to the frame section, post means on the frame for pivotally mounting the movable section, and a leaf spring connected to the carrier and to the post means.

37. Hand-held apparatus as defined in claim 36, wherein the label applying means includes an applicator roll rotatably mounted on the post means.

* * * * *